N. D. CHARD.
LATHE.
APPLICATION FILED JULY 7, 1910.
1,022,721.
Patented Apr. 9, 1912.
2 SHEETS—SHEET 1.
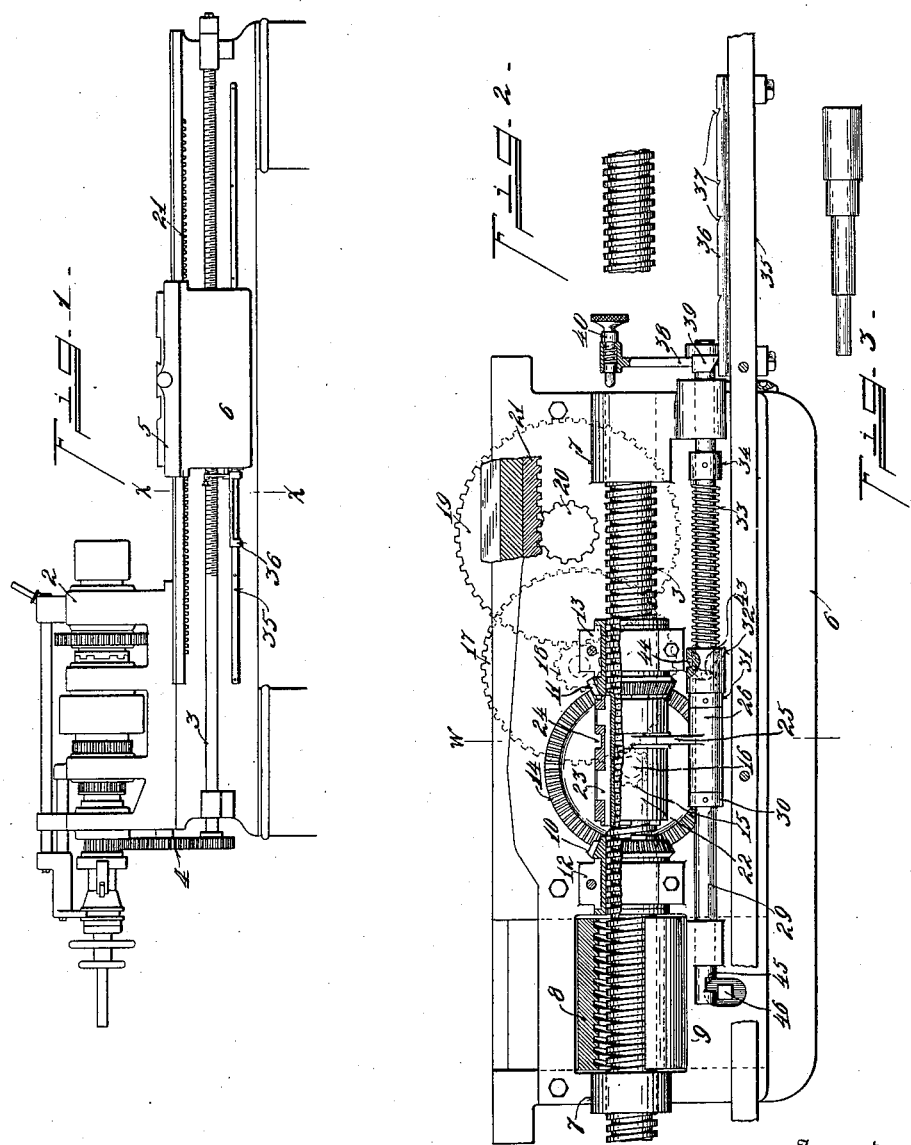
Witnesses
Inventor
Nicholas D. Chard
By Word & Word
Attorneys

N. D. CHARD.
LATHE.
APPLICATION FILED JULY 7, 1910.

1,022,721.

Patented Apr. 9, 1912.

2 SHEETS—SHEET 2.

Witnesses
Oliver B. Kaiser

Inventor
Nicholas D. Chard
By Wood & Wood
Attorneys

UNITED STATES PATENT OFFICE.

NICHOLAS D. CHARD, OF CINCINNATI, OHIO, ASSIGNOR TO THE LODGE & SHIPLEY MACHINE TOOL COMPANY, OF CINCINNATI, OHIO, A CORPORATION OF OHIO.

LATHE.

1,022,721.

Specification of Letters Patent.

Patented Apr. 9, 1912.

Application filed July 7, 1910. Serial No. 570,832.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in automatic stop mechanism for engine lathes.

The principal object of the invention is to provide a templet supported in the path of carriage travel and provided with trip engaging members disposed at predetermined intervals, each member being adapted to coöperate with the trip, to automatically throw out the carriage feed.

The features of the invention are more fully set forth in the description of the accompanying drawings, forming a part of this specification, in which:—

Figure 4:
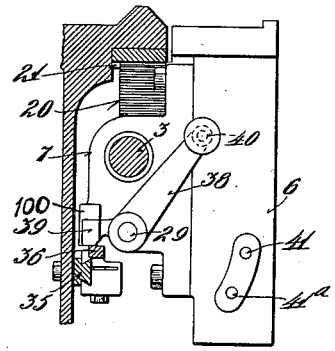
Figure 5:
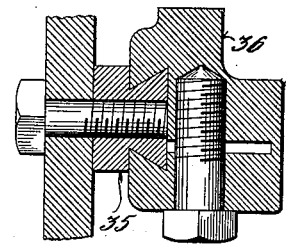
Figure 6:
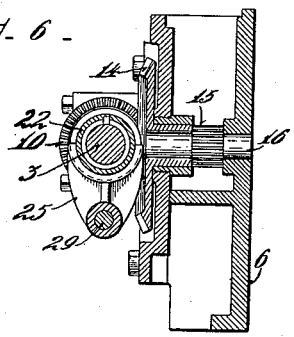
Figure 7:
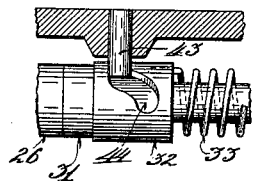
Figure 8:
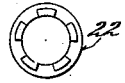

Figure 1 is a front elevation of a lathe illustrating the features of my invention in conventional form. Fig. 2 is a rear elevation of the apron and feed controlling mechanism, with some of the parts in section. Fig. 3 is a plan view of the work to be turned. Fig. 4 is an enlarged section on line $x, x$, Fig. 1. Fig. 5 is an enlarged section through the templet and supporting bar. Fig. 6 is a section on line $w, w$, Fig. 2. Fig. 7 is a detailed view of the cam collar mounted upon the clutch actuating rod, with a portion of the apron illustrated in section, and a pin engaging into the cam groove for shifting the clutch mechanism. Fig. 8 is a detailed view of one end of the clutch sleeve.

1 represents the lathe bed, 2 the head stock, which may be of any conventional form.

3 represents the feed screw in driven connection with the head stock by a train of gears 4, or in any well-known manner by a system of change gears, or variable speed system of gearing common in the art.

5 represents the carriage slidable on ways formed on the bed, and 6 represents the carriage apron depending therefrom.

The feed screw 3 passes through the bearings 7 formed on the rear surface of the apron, as illustrated in Fig. 2, and 8, 9, represent half-nuts adapted to be clamped to the feed screw for feeding the carriage and apron for screw-cutting. These half-nuts are simultaneously operated by any well-known means.

10, 11 represent beveled gears, each provided with a sleeve extension journaled in the bearings 12, 13, respectively, and substantially free from driven or frictional engagement with the feed screw 3.

14 represents a beveled gear in mesh with the beveled gears 10 and 11, transmitting motion to a system of gearing carried by the apron for feeding the carriage upon the bed, according to which of the gears 10 or 11 is clutched to the feed screw 3, to transmit motion to the feeding devices for the tool slide.

Any type of apron transmission mechanism may be employed common in the art, or otherwise. The type illustrated comprises the following instrumentalities:—15 represents a gear fixed to the shaft 16 journaled in the apron 6, and to which shaft the beveled gear 14 is also fixed. 17 represents a gear in mesh with gear 15, fixed to a stud shaft, and 18 represents a pinion in driven connection with gear 17, and in mesh with a gear 19 fixed to a shaft journaled in the apron. 20 represents a rack gear in driven connection with gear 19, with its teeth thereof in mesh with the teeth of the rack 21 fixed to the bed 1 of the lathe. Thus, when gear 14 is revolved, motion will be transmitted to the train of gears 15, 17, 18, 19, and rack gear 20, feeding the carriage horizontally on the bed. 22 represents a clutch sleeve splined to the feed screw 3 by means of the key 23, and each end of the sleeve is provided with clutch teeth adapted to alternately engage with clutch teeth formed respectively on the gears 10 and 11, for alternately engaging said gears in driving connection with the feed screw for a forward or reverse travel of the carriage on the bed. Said clutch sleeve is provided with a circumferential groove 24, into which a yoke-arm 25 engages, projected from a sleeve 26 loosely mounted upon the actuating rod 29, and held in position upon the rod 29 by means of the collars 30, 31 fixed to the rod 29. This permits of longitudinal movement of the yoke-arm 25, for shifting the clutch sleeve, at the same time permits free rotation of the rod 29.

32 represents a cam collar splined upon the actuating rod 29, bearing against the collar 31, upon one side, and with its opposite side engaged by one end of the spring 33. The function of said cam will be more fully hereinafter described. The opposite end of the spring 33 engages against a collar 34, fixed to the actuating rod 29, for normally maintaining and automatically engaging the clutch sleeve 22 with the beveled gear 11, provided however, that the rod 29 is free to move in such direction. To automatically unclutch such driving connection between the sleeve 22 and beveled gear 11, at various points of apron or carriage travel, the following instrumentalities are provided:—35 represents a bar fixed to the front side of the lathe bed 1, preferably of dove-tail formation (see Fig. 5) upon which is adjustably mounted a templet 36, having one or more fixed trip engaging members placed at predetermined intervals, relative to each other, and, as illustrated, are in the form of notches 37, into which clutch tripping mechanism is adapted to engage to provide a series of automatic stops of carriage feed to be had at predetermined points of carriage travel.

38 represents a bell-crank lever fixed to the actuating rod 29, (see Figs. 2 and 4) provided with an arm 39 projected therefrom, and adapted to engage into any one of the notches 37 in the path of its travel with the carriage. The opposite arm of the bell-crank lever 38 is provided with a spring actuated detent 40, adapted to engage into any one of the orifices or notches 41 in the arc of bell-crank lever movement, and lock the same in various adjusted positions, swinging the arm 39 out of possible engagement with any one of the notches of the templet, or to shift the clutch-sleeve into an intermediate neutral position, or into engagement with the beveled gear 10.

When the bell-crank lever occupies the position illustrated in Fig. 4, the arm 39 is in position to automatically engage into a successive notch in the templet, which engagement will shift the actuating rod 29 through the movement of the carriage, disengaging the clutch sleeve 22 from the beveled gear 11, stopping the feed in that direction; releasing the engagement of the arm 39 with such notch by swinging the same upward will instantly restore the driving connection between clutch sleeve 22 and beveled gear 11, through the tension of spring 33 against the collar 34, the collar 32 being arrested against longitudinal movement by means of a pin 43 projected from the apron, and engaging into a cam groove 44, formed on the periphery of the collar 32, (see Figs. 2 and 7).

The spring 33 performs a two-fold function, that of automatically moving the rod 29 longitudinally to automatically engage and maintain the clutch sleeve 22 into driving connection with the beveled gear 11, and to maintain the arm 39 of the lever 38 under tension upon the templet, so as to bring the arm into engagement with a given notch, after a predetermined travel of the carriage. Shifting the lever 38 so as to bring the detent into engagement with the notch or orifice 41, will swing the arm 39 to a position free from notch engagement with the templet, and which movement will rotate the actuating rod 29 and cam collar 32 sufficiently to engage the pin 43 with the angular surface of the cam groove 44, moving the collar 32 and actuating rod 29 in a direction intermediate of the gears 10 and 11, in which position the clutch sleeve 22 occupies a neutral position.

Moving the lever 38 to a position to engage the detent 40 with the orifice 41ª will continue the longitudinal movement of the collar 32, rod 29, yoke-arm 25, and clutch sleeve 22, to bring the same into engagement with the beveled gear 10, for imparting reverse feed to the carriage and apron.

To prevent simultaneous connection of half-nuts 8 and 9, with the feed screw 3, and the sleeve 22 with any one of the gears 10, 11, the following provision is made:—

45 represents a notch formed in the actuating rod 29, and 46 represents a lug projected from the half-nut 9, adapted to engage into the notch 45 when the half-nut is moved upwardly, to engage the same with the feed screw. This, however, can only be accomplished when the clutch sleeve 22 occupies its intermediate or neutral position, in which instance the notch 45 and lug 46 are relatively alined; but if the clutch sleeve 22 is in engagement respectively with any one of the gears 10 and 11, the half-nut cannot be clamped to the feed screw, and lug 46 in such instance would engage against the periphery of the rod 29, and limit or prevent such half-nut engagement with the feed screw.

As illustrated in the drawings, the templet 36 is removably and adjustably secured to the rod or bar supported on the bed in juxtaposition to the line of carriage travel.

In Fig. 2 a templet is illustrated in position, and just under it is shown a lathe spindle. The top notches of the templet being respectively alined with the spindle shoulder point, when the spindle to be turned is clamped between the lathe centers and the templet is secured in its proper place on the supporting rod or bar.

For illustration, it may be assumed that the spindle to be turned represents a spindle to be used in a fourteen inch lathe, and that the particular templet shown is a master templet for forming spindles for this particular fourteen inch size of lathe. The notches of the templet are measured with exact precision, relatively from each other, to represent the shoulder lengths of the spindle for the fourteen inch lathe, so that this master templet will produce and reproduce spindles of exact dimensions, each the exact duplicate of the other.

If the user has a lathe with one of these templet-formed spindles, and after five years the spindle wears out, he can secure from the manufacturer a new spindle, the exact duplicate of the original, the product of the original master templet. This eliminates altogether the uncertain factor of the varying degrees of skill of different operators. In like manner, there will be a master templet for each of the different sized spindles produced by a given maker, and as these master templets are interchangeable on the supporting rod, all that the workman has to do is to select the master templet for the particular spindle to be produced.

The adjustability of this templet on the supporting rod enables it to be shifted and positioned relative to the work, so that regardless of the length of the work, the templet may be adjusted to indicate the positions relatively of the shoulder points to be cut.

It is obvious that this device is equally effective in a hand feed of the carriage in providing a predetermined stop for the carriage feed.

The longitudinal movement of the controlling rod 29 is definitely limited by the engagement of the inner end of the arm 39 against the boss 100, see Fig. 4, which boss is formed on the bracket 7 in which the screw 3 and the rod 29 have bearings. Said slide rod or clutch controller 29 is permitted just sufficient longitudinal movement in tripping to disengage the clutch teeth, so that the stoppage is instantaneous. This provision permits of the cutting and automatic stopping to the one one-thousandth part of an inch, and the last portion of the cut does not have to be made by hand, as it ordinarily does, in connection with automatic trips. This is very important in precision work, and in setting the rod 36, no allowance has to be made for lost motion. In operation, the trip not only throws out the feed at the exact predetermined point, but at such point the rod 36 engages the arm 39 on the controller 29 and brings the latter solidly up against the bracket, so that it not only throws out the clutch by a predetermined length of movement, but the further movement of the controller is rigidly blocked by the bracket 7. Even in hand feeding, the movement of the carriage would be arrested whenever the rod 39 engaged the said boss 100. This trip and stop mechanism is precise and reliable and the templet rod is easily adjusted in the initial setting.

Having described my invention, I claim:—

1. In a device of the class described, a bed, a carriage movable thereon, a carriage apron, means for feeding the carriage, a feed controlling device, a support on the bed adjacent the apron extending in the path of travel thereof, a bar adjustably secured to said support and formed with a series of rigid and definitely positioned engaging devices, a member on the apron operatively connected to said feed controller and adapted to be moved into and out of line with said rigid engaging devices, and means for definitely limiting the movement of the feed controlling device.

2. In a device of the class described, a bed, a carriage and apron, a carriage feed, a movable feed controlling device, a templet stop supported on the bed adjacent the carriage, means on the apron for engaging and disengaging the templet stops, said means being operatively connected to said feed controlling device, and a stop against which the feed controlling device is engaged at the end of the tripping movement.

3. In a device of the class described, a bed, a carriage, a carriage feed, a controlling clutch therefor, a longitudinally movable rod for shifting said clutch, said rod being adapted to be rocked, means for limiting the longitudinal movement of said rod, a handle and detent arm on the end of said rod, and a templet stop supported on the bed, having rigid definitely positioned engaging devices, adapted to coöperate with said detent to throw out the feed and definitely arrest the carriage movement.

4. In a device of the class described, a bed, an apron carriage, a feed therefor, a feed controller, a support on the bed in the line of carriage travel, a bar adjustably and removably secured on the support, said bar being formed with a series of definitely positioned engaging devices, a member on the apron for coöperating therewith, means whereby said engagement actuates the feed controller, and means for definitely limiting the movement of the feed controller actuating mechanism as it is influenced by the moving carriage during the cutting operation to bring the carriage to a dead stop.

In testimony whereof, I have hereunto set my hand.

NICHOLAS D. CHARD.

Witnesses:
OLIVER B. KAISER,
EMMA SPENER.

Copies of this patent may be obtained for five cents each, by addressing the "Commissioner of Patents, Washington, D. C."